US012027746B2

(12) United States Patent
Bailey et al.

(10) Patent No.: US 12,027,746 B2
(45) Date of Patent: Jul. 2, 2024

(54) MITIGATING WIND DAMAGE TO WIND EXPOSED DEVICES

(71) Applicant: DISH Network L.L.C., Englewood, CO (US)

(72) Inventors: Matthew Bailey, Denver, CO (US); William Roberts, Centennial, CO (US)

(73) Assignee: DISH Network L.L.C., Englewood, CO (US)

( * ) Notice: Subject to any disclaimer, the term of this patent is extended or adjusted under 35 U.S.C. 154(b) by 374 days.

(21) Appl. No.: 17/393,627

(22) Filed: Aug. 4, 2021

(65) Prior Publication Data

US 2021/0367318 A1 Nov. 25, 2021

Related U.S. Application Data

(62) Division of application No. 16/133,853, filed on Sep. 18, 2018.

(51) Int. Cl.

*H01Q 1/00* (2006.01)
*H01Q 1/08* (2006.01)
*H01Q 1/12* (2006.01)

(52) U.S. Cl.

CPC ............. *H01Q 1/005* (2013.01); *H01Q 1/084* (2013.01); *H01Q 1/1235* (2013.01); *H01Q 1/1207* (2013.01)

(58) Field of Classification Search

None
See application file for complete search history.

(56) References Cited

U.S. PATENT DOCUMENTS

| | | | | |
|---|---|---|---|---|
| 4,490,726 A | | 12/1984 | Weir | |
| 5,485,169 A | | 1/1996 | Kitabatake | |
| 5,517,204 A | * | 5/1996 | Murakoshi | H01Q 1/18 74/5.34 |
| 5,554,998 A | | 9/1996 | Sherwood | |
| 5,646,638 A | | 7/1997 | Winegard | |
| 5,929,817 A | | 7/1999 | Clark | |

(Continued)

OTHER PUBLICATIONS

U.S. Appl. No. 17/357,688, filed, Jun. 24, 2021.

(Continued)

*Primary Examiner* — Steven M Marsh
(74) *Attorney, Agent, or Firm* — Wash Park IP Ltd.; John T. Kennedy

(57) ABSTRACT

Disclosed are devices, system, and method for mitigating wind damage to satellite antennas and for reducing the amount of ballast required to secure the satellite antennas. The device, system, and method include a mast on which an antenna may be affixed, a pivot gear capable of rotating between two or more positions, and a tension force or retention force on the pivot gear. A load force applied to the antenna creates a risk of damage proportional to the load force. The antenna system is capable of transitioning from a first orientation into a second orientation when the load force exceeds tension force or retention force, or the sum thereof, such that the antenna system experiences a reduced load force and therefore a reduced risk of damage. The device, system, and method also reduce the amount of ballast required to secure a non-penetrating antenna installation against tipping or sliding.

20 Claims, 7 Drawing Sheets

(56) References Cited

U.S. PATENT DOCUMENTS

| | | | | |
|---|---|---|---|---|
| 6,366,253 | B1 * | 4/2002 | Hemmingsen, II | H01Q 19/132 343/882 |
| 6,424,314 | B1 | 7/2002 | Baghdaasarian | |
| 7,015,872 | B1 * | 3/2006 | Little | H01Q 1/1242 343/890 |
| 10,519,688 | B2 | 12/2019 | Gharabegian | |
| 10,554,436 | B2 | 2/2020 | Gharabegian | |
| 2004/0177871 | A1 | 9/2004 | Harbaugh | |
| 2008/0158078 | A1 | 7/2008 | Allen | |
| 2009/0085825 | A1 | 4/2009 | Conrad | |
| 2009/0085826 | A1 | 4/2009 | Conrad | |
| 2009/0188537 | A1 | 7/2009 | Bacik | |
| 2009/0224549 | A1 * | 9/2009 | Williams | F03D 15/10 290/55 |
| 2009/0224551 | A1 * | 9/2009 | Williams | F03D 5/06 290/55 |
| 2009/0224553 | A1 * | 9/2009 | Williams | F03D 5/06 290/55 |
| 2009/0243955 | A1 | 10/2009 | Legare et al. | |
| 2010/0149059 | A1 * | 6/2010 | Patel | H01Q 3/08 343/765 |
| 2011/0032172 | A1 * | 2/2011 | Kirby | H01Q 1/084 343/878 |
| 2011/0283640 | A1 | 11/2011 | Miller | |
| 2015/0023017 | A1 * | 1/2015 | Smith | F21L 13/00 362/249.03 |
| 2015/0236397 | A1 | 8/2015 | Son | |
| 2017/0040684 | A1 | 2/2017 | Turner | |
| 2018/0323489 | A1 | 11/2018 | Vermillion, Jr. | |
| 2019/0335865 | A1 | 11/2019 | Mullet | |
| 2021/0320407 | A1 | 10/2021 | Roberts et al. | |
| 2021/0367318 | A1 | 11/2021 | Bailey et al. | |

OTHER PUBLICATIONS

U.S. Appl. No. 17/357,688, Notice of Allowance, dated May 22, 2023.

U.S. Appl. No. 18/359,803, filed Jul. 26, 2023.

U.S. Appl. No. 16/133,853, Issue Fee Payment, dated Aug. 4, 2021.

U.S. Appl. No. 16/133,853, Issue Notification, dated Aug. 19, 2021.

U.S. Appl. No. 17/357,688, Response to Non-Final Office Action, dated Mar. 30, 2023.

U.S. Appl. No. 17/357,688, Restriction, Aug. 3, 2022.

U.S. Appl. No. 17/357,688, Non-Final Office Action, dated Dec. 14, 2022.

* cited by examiner

MITIGATING WIND DAMAGE TO WIND EXPOSED DEVICES

CROSS-REFERENCE TO RELATED APPLICATIONS

This application is a Divisional application of and claims priority to co-pending U.S. patent application Ser. No. 16/133,853, filed on Sep. 18, 2018, in the name of inventors Matthew Bailey and William Roberts, and entitled "Mitigating Wind Damage to Wind Exposed Devices," the entire contents of which are incorporated herein by reference.

TECHNICAL FIELD

The subject matter described herein relates to devices, systems and methods for mitigating wind damage to wind exposed devices. The devices, systems and methods have particular but not exclusive utility for satellite TV and Internet service installations.

BACKGROUND

Satellite antennas are known, and are used to deliver satellite TV and Internet services. They may additionally be used for navigation, meteorology, fleet management, deep space communication, and military purposes. However, all outdoor antennas are subject to wind loads, and are required to meet strict wind loading specifications in order to be fielded. In an example, an antenna may be required to remain operational during a wind event of up to 55 mph, and may further be required to be operational after a wind event of up to 80 mph, and may further be required to withstand a wind event of up to 155 mph while having no part of the antenna become a projectile.

During the installation of a non-penetrating antenna mount, technicians may use ballast such as cinder blocks to supply enough mass to prevent the mount from tipping or sliding during wind events. For a non-penetrating mount to meet its requirement for a 110 mph wind event, this may require the equivalent of 30 cinder blocks, or more. However, each cinder block carried on a service van may increase gasoline costs by about $30 per block per van per year. Across a fleet of several thousand vehicles, this can equate to millions of dollars in fuel expenses each year.

It is to be appreciated that such commonly used components, installation processes, and transportation approaches have numerous drawbacks, including risks of misalignment, time costs, shipping costs, equipment wear and tear, personnel risk, and otherwise. Accordingly, needs exist for devices, processes, approaches, and otherwise which address the forgoing and other concerns.

The information included in this Background section of the specification, including any references cited herein and any description or discussion thereof, is included for technical reference purposes only and is not to be regarded as subject matter by which the scope of the disclosure is to be bound.

SUMMARY

In accordance with at least one embodiment of the present disclosure a collapsible antenna mast attachment is disclosed. The collapsible antenna mast attachment helps to drastically minimize the number of cinder blocks needed for non-penetrating mounts while also providing additional robustness for penetrating mount installations. In accordance with at least one embodiment, a collapsible antenna mast attachment may include a spring loaded or other resilient, hinge between the antenna assembly and the pole that it is mounted in such a way that when it experiences a certain load, the mount begins to gradually fold the antenna assembly out of the way. Since the reflector component of a satellite antenna creates the most drag in a wind event, permitting it to fold out of the way reduces the drag force on the antenna, and thus the tipping or sliding force on the non-penetrating mount, which in turn lowers the number of blocks or other ballast needed to prevent tipping or sliding. Since the antenna assembly doesn't maintain incidence to the wind event, it will not experience the damage that it would using a traditional mount that doesn't rotate to a less wind exposed orientation. This means that if the mount rotates when winds beyond 55 mph occur, the customer or end user may be able to reset the device on their own without causing a truck roll, which saves additional time, money, and resources for both the consumer and the service provider.

The collapsible antenna mast attachment disclosed herein has particular, but not exclusive, utility for the installation of satellite TV and Internet service equipment. The collapsible antenna mast attachment permits the satellite antenna to withstand high wind loads with reduced risk of damage. It further permits the satellite antenna to be installed without large amounts of ballast to prevent tipping or sliding, and still further permits the customer or end user to reset the antenna manually after a major wind event has concluded.

The device, system, and method include a mast on which an antenna may be affixed, a pivot gear capable of rotating between two or more positions, and a tension force "t" or a retention force "r" on the pivot gear. A load force "F" applied to the antenna creates a risk of damage proportional to the load force F. The antenna system is capable of transitioning from a first orientation into a second orientation when the load force F exceeds the tension force t or the retention force r, or the sum thereof, such that the antenna system experiences a reduced load force and therefore a reduced risk of dynamic load damage proportional to the load force F. The device, system, and method also reduce the amount of ballast required to secure a non-penetrating antenna installation.

In accordance with at least one embodiment of the present disclosure, a collapsible attachment device may be provided for use in configuring an antenna system into each of a first orientation and a third orientation. The collapsible attachment device may include an upper mast onto which an antenna system may be affixed. A pivot gear may be provided in association with the upper mast. The tension force t may be provided by zero or more detents in the pivot gear. An axel may be used around which the pivot gear may rotate. The retention force r may be provided by zero or more retention elements. A load may be applied to the antenna system that causes a first load force. The collapsible attachment device may be configured to facilitate rotation of the upper mast from a first orientation into a second orientation when the first load force exceeds the retention force r and into a third orientation when a second load force exceeds both the retention force r and the tension force t, or the sum thereof.

For at least one embodiment, a collapsible attachment device may be configured such that once the first load force subsides below a first threshold, the upper mast returns automatically to the first orientation. For at least one embodiment, a collapsible attachment may be configured such that once the first load force subsides below a first threshold, the collapsible attachment device is configured to facilitate return of the upper mast to the first orientation by application of a manually applied force.

For at least one embodiment, a collapsible attachment device may be configured into at least one second orientation arising between the first orientation and the third orientation, such that the upper mast rotates from the first orientation to the at least one second orientation under a second load force smaller than the first load force. The collapsible attachment device may be configured such that once the second load force subsides below a second threshold, the upper mast returns automatically to the first orientation. For at least one embodiment, a collapsible attachment may be configured such that once the second load force subsides below a second threshold, the collapsible attachment device is configured to facilitate return to the first orientation by means of a manually applied force. The first load force may include a wind load of 55 miles per hour or greater. A collapsible attachment device may include printed instructions for returning the device from the third orientation to the first orientation. A collapsible attachment device may be configured for use with an amount of ballast used to secure the antenna system that is less than an amount of ballast used to secure a second antenna system lacking the collapsible attachment device.

For at least one embodiment of the present disclosure, a method for mitigating dynamic load damage on an antenna system may include the operations of providing an upper part of a collapsible attachment. The upper part may include an upper mast onto which an antenna system may be affixed. The operations may further include providing a pivot gear and providing a middle part of the collapsible attachment. The middle part may include at least one channel configured for insertion therein of the pivot gear and at least one center shaft configured for insertion of an axel configured to retain the pivot gear to the middle part. The operations may further include providing a retention element coupled to each of the pivot gear and the middle part of the collapsible attachment and providing, by use of the retention element, either or both of a tension force t and a retention force r on the pivot gear. When a load force exceeding a first threshold is applied to the antenna system, the collapsible attachment is configured to rotate the antenna system from a first orientation into a third orientation. The first threshold may be a retention force r, the tension force t, or the sum thereof. Upon rotation of the antenna system into the third orientation, the antenna system may experience a reduced load force.

For at least one embodiment, a method for mitigating dynamic load damage on an antenna system may include the operations of automatically returning the antenna system to the first orientation when the first load force subsides below the first threshold. For at least one embodiment, a method for mitigating dynamic load damage on an antenna system may include the operations of manually returning the antenna system to the first orientation when the first load force subsides below the first threshold. For at least one embodiment, the first threshold is a wind load of 55 miles per hour or greater. For at least one embodiment, a method for mitigating dynamic load damage on an antenna system may include providing printed instructions for returning the antenna system from the third orientation to the first orientation. For at least one embodiment, a method for mitigating dynamic load damage on an antenna system may include the use of an amount of ballast used to secure the antenna system that is less than an amount of ballast used to secure a second antenna system not practicing a method according to an embodiment of the present disclosure.

For at least one embodiment of the present disclosure, a system for reducing an amount of ballast used to secure a wind exposed device may include a wind exposed device, a mast mount coupled to the wind exposed device, a first quantity of ballast in association with the mast mount that secures the mast mount under a dynamic load force that is proportional to the first quantity of ballast used, and a collapsible attachment coupled to and between each of the wind exposed device and the mast mount.

For at least one embodiment, the collapsible attachment may include an upper part, a pivot gear coupled to the upper mast. The pivot gear may include a detent. The collapsible attachment may include a retention element configured to exert the retention force r on the pivot gear. The collapsible attachment may include, a middle part, coupled to the pivot gear by an axle and the retention element. The middle part may include a tab configured to exert a tension force t on the detent when the wind exposed device is in a first orientation. For at least one embodiment, the pivot gear may be configured to rotate about the axel. The pivot gear may be configured to rotate from the first orientation to a third orientation when a load force exerted on the wind exposed devices exceeds either or both of the retention force r and the tension force t, or the sum thereof.

For at least one embodiment and when configured in the third orientation, the wind exposed device may experience a second load force that is less than the first load force such that the second load force facilitates use of a second quantity of ballast to secure the wind exposed device. The second quantity of ballast may be less than the first quantity of ballast.

For at least one embodiment, the collapsible attachment may be configured to facilitate return of the wind exposed device to the first orientation automatically or by means of a manually applied force. The load force on the wind exposed device may be a wind load of 55 miles per hour or greater. Printed instructions for returning the wind exposed device from the third orientation to the first orientation may be provided on or with the wind exposed device. A risk of damage to the wind exposed device is less when the device is configured into the third orientation than in the first orientation.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the collapsible antenna mast attachment, as defined in the claims, is provided in the following written description of various embodiments of the disclosure and illustrated in the accompanying drawings.

DETAILED DESCRIPTION

In accordance with at least one embodiment of the present disclosure, a collapsible antenna mast attachment is disclosed.

Figure 1:
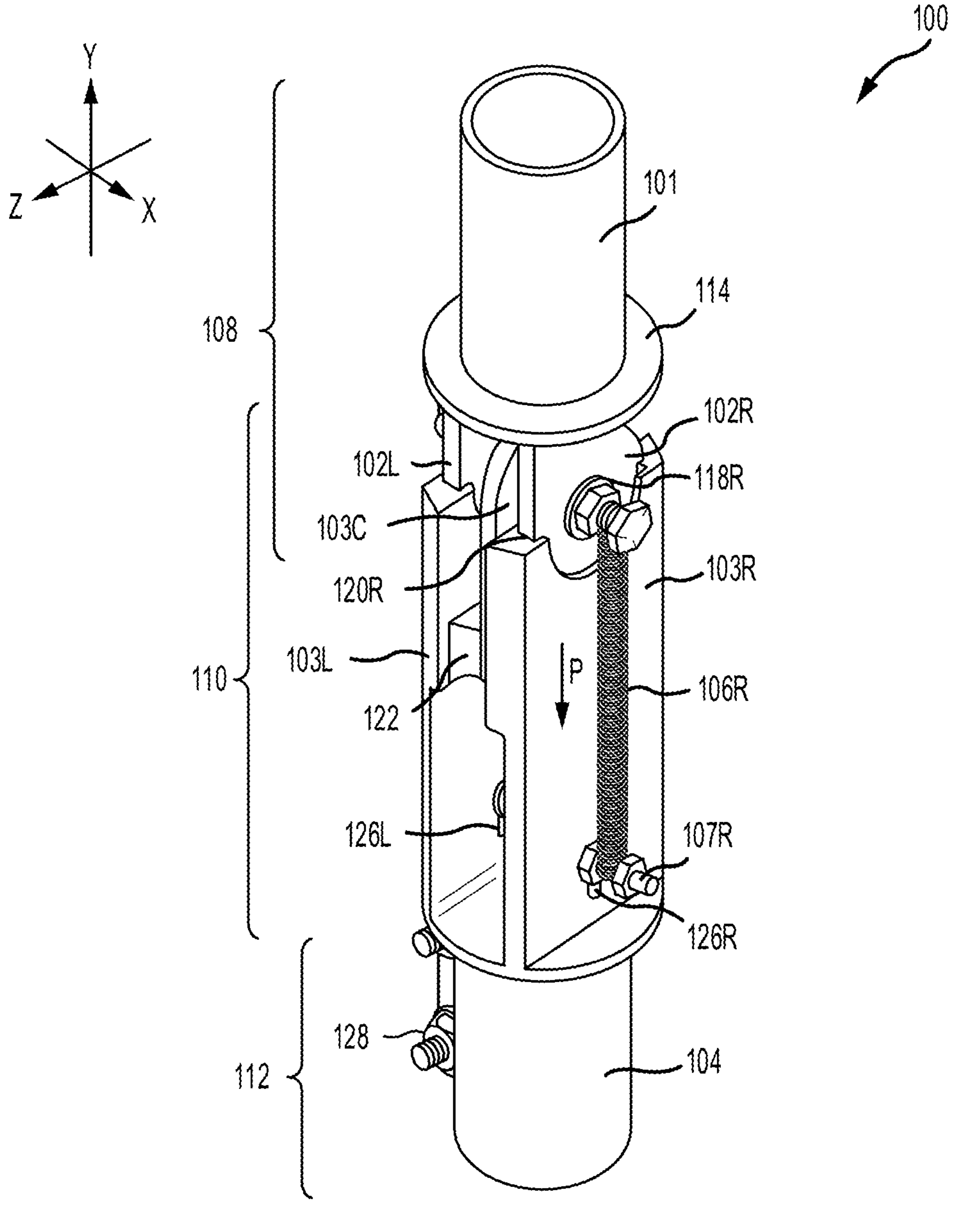
FIG. 1 is a top front isometric view of a collapsible antenna mast attachment in accordance with at least one embodiment of the present disclosure.
Figure 2:
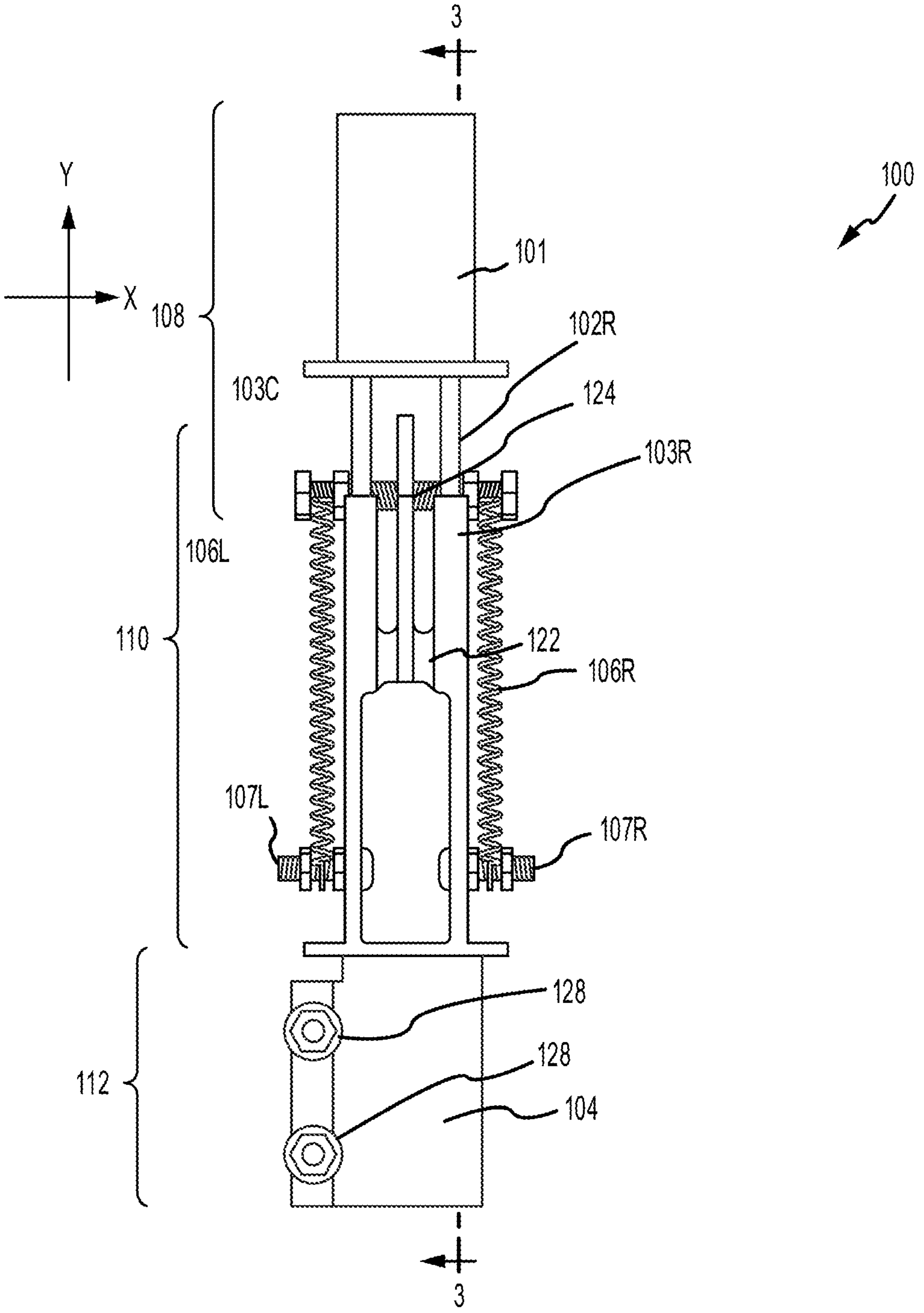
FIG. 2 is a front view of a collapsible antenna mast attachment in accordance with at least one embodiment of the present disclosure.
Figure 3:
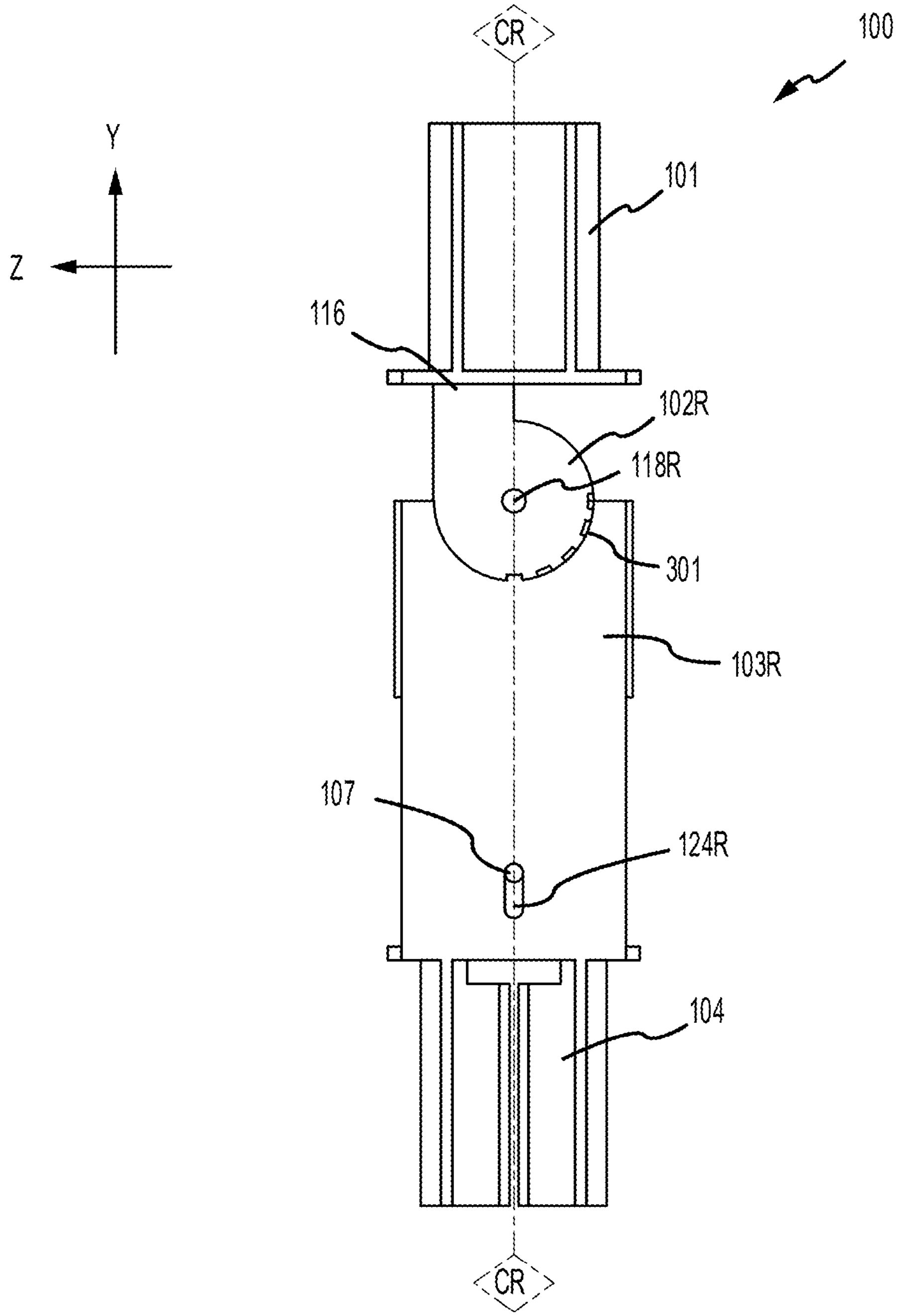
FIG. 3 is a right side cutaway view of a collapsible antenna mast attachment along the lines 3-3 of FIG. 2 and in accordance with at least one embodiment of the present disclosure.
Figure 4:
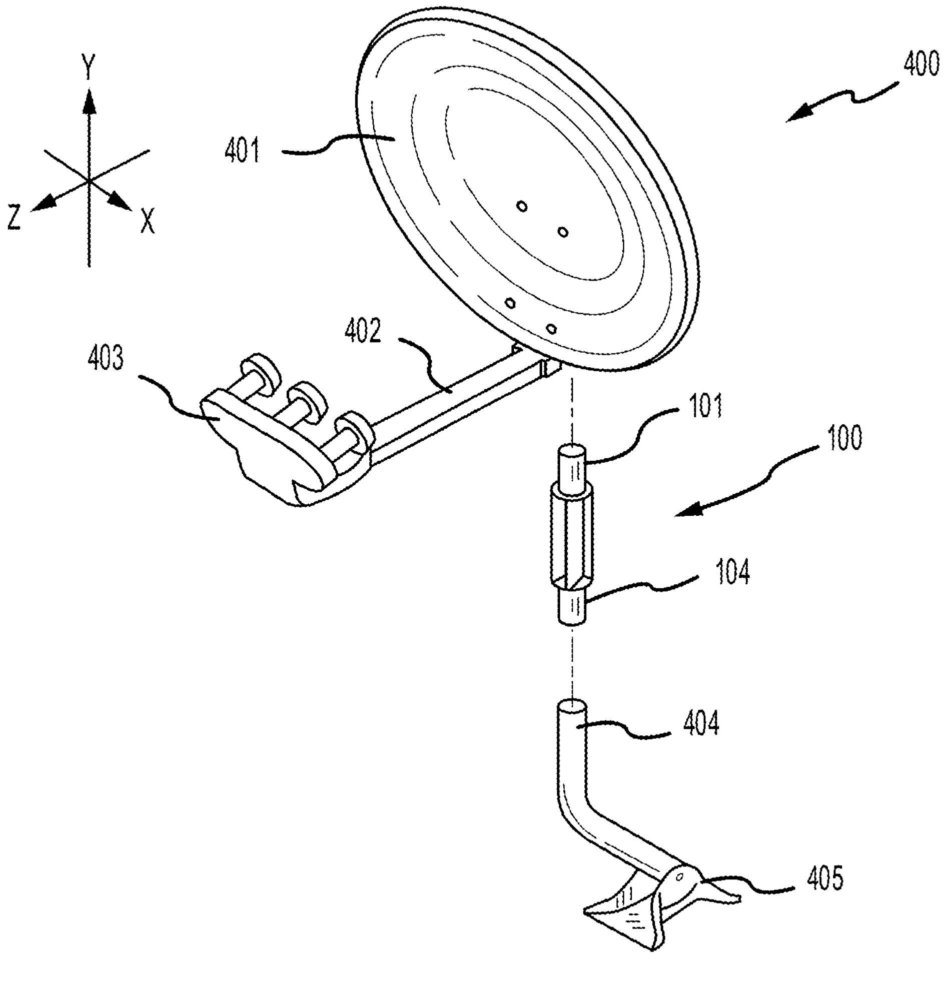
FIG. 4 is a top front isometric view and exploded view of a collapsible antenna mast attachment in association with a satellite antenna and in accordance with at least one embodiment of the present disclosure.

As shown in FIGS. 1, 2 and 3, a collapsible antenna mast attachment (hereinafter, a "collapsible attachment") may include three main formed parts: a lower part 112, a middle part 110, an upper part 108 and one or more retention elements 106. The upper, middle and lower parts 108/110/112 may be configured as one or more assemblies, such as a formed assembly, multiple assemblies attached together, or otherwise. The lower part 112 may be configured for attachment to a lower mast (as described further below and as shown in FIG. 4). The upper part 108 may be configured for attachment to an antenna assembly (as described further below and as shown in FIG. 4).

Figure 5:
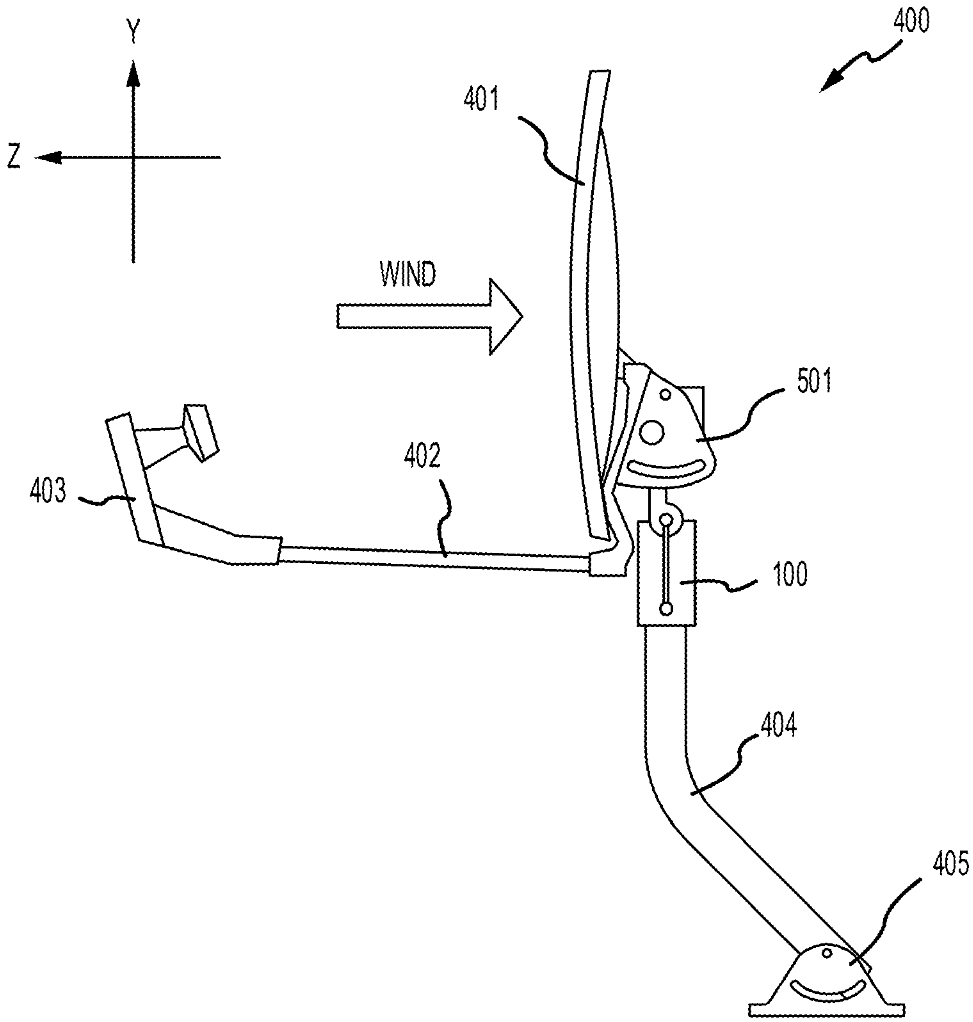
FIG. 5 is a right side view of a collapsible antenna mast attachment in association with a satellite antenna with the antenna positioned at a first orientation and experiencing a wind load in accordance with at least one embodiment of the present disclosure.
Figure 6:
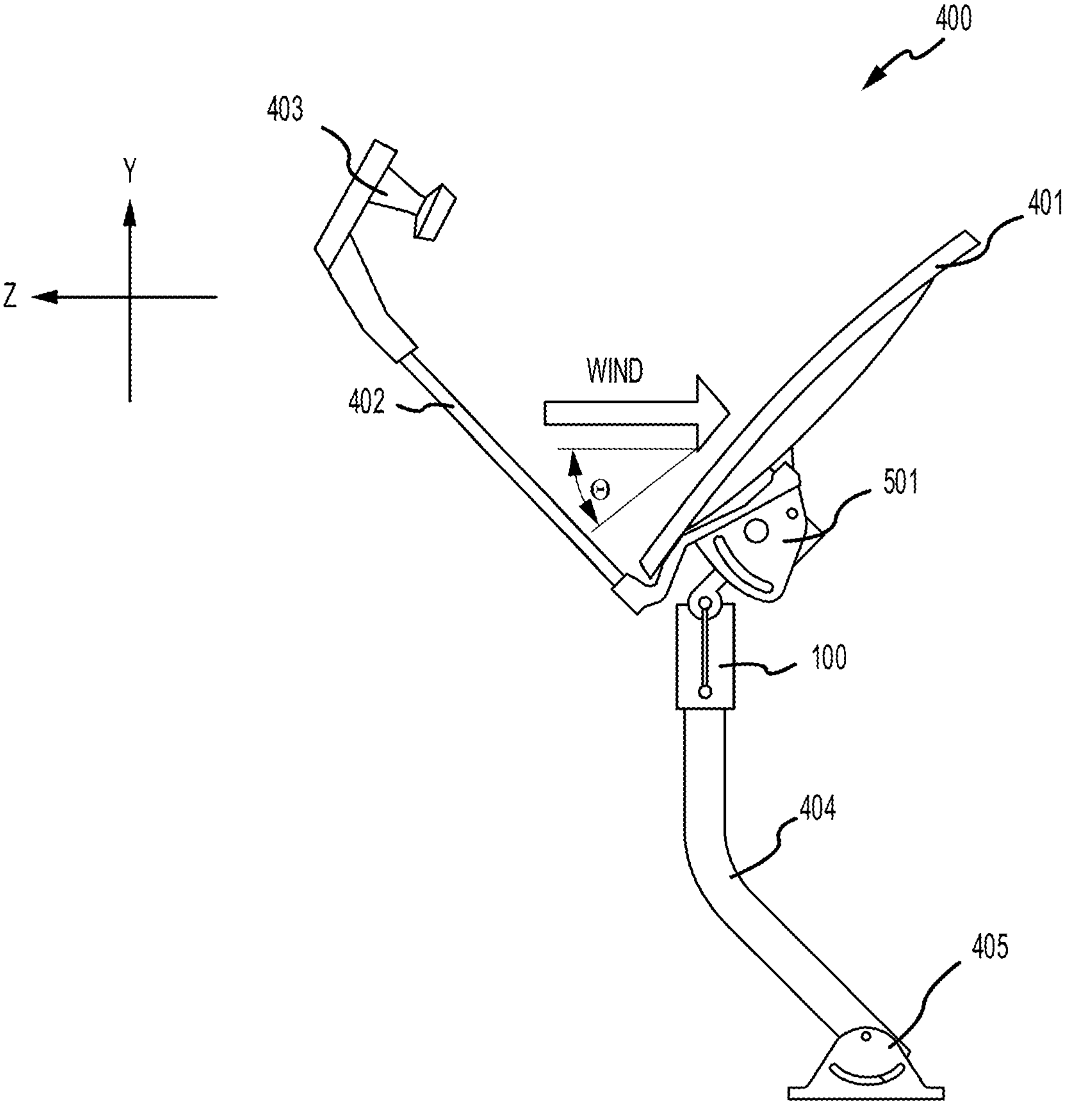
FIG. 6 is a right side view of a collapsible antenna mast attachment in association with a satellite antenna experiencing a wind load and as collapsed to a second orientation and in accordance with at least one embodiment of the present disclosure.
Figure 7:
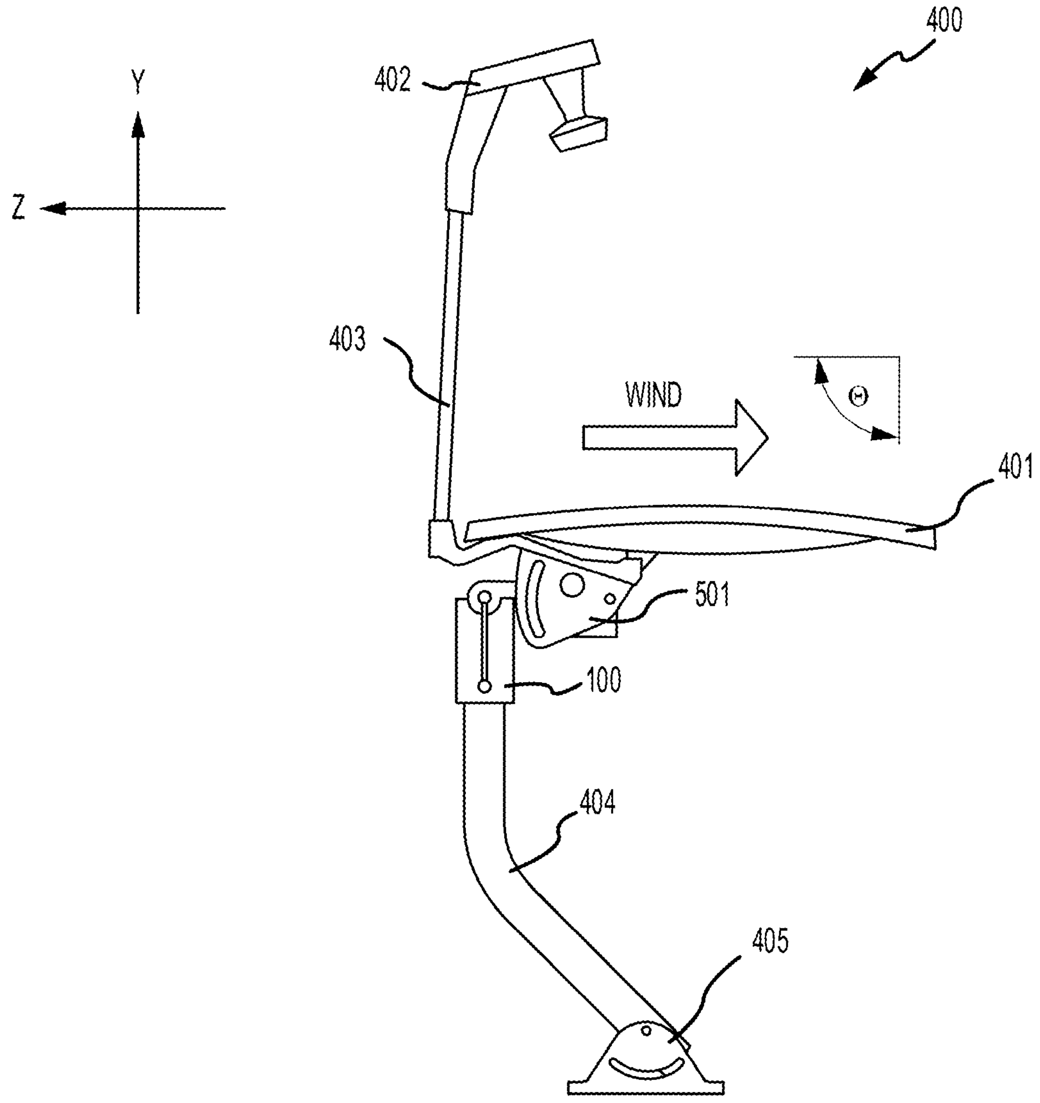
FIG. 7 is a right side view of a collapsible antenna mast attachment in association with a satellite antenna experiencing a wind load and as collapsed to at third orientation and in accordance with at least one embodiment of the present disclosure.

The middle part 110 mechanically connects the lower part 112 with the upper part 108. The middle part 110 may be configured to facilitate rotation of the upper part 108 relative to each of the middle part 110 and the lower part 112 such that the upper part 108 may pivot, under certain conditions, from a first orientation, such as a substantially vertical position as described further below and as shown in FIG. 5, to one or more second or inclined orientations, such as a second inclined position as described further below and as shown in FIG. 6, and finally to a third orientation, such as a substantially horizontal position, as described further below and as shown in FIG. 7. The middle part 110 and is configured to adjust orientation of an antenna element attached to the collapsible attachment between the first, one or more second, and third orientations based upon various wind and/or other loading conditions.

For at least one embodiment, the upper part 108 may include an upper mast 101, a collar 114 positioned at a lower end of the upper mast 101, and first/left and second/right pivot gears 102L/102R. The first and second pivot gears 102L/102R may include one or more detents 301 which facilitate rotation of the pivot gears 102 under certain conditions in a first rotational direction about an "X" axis, while preventing rotation of the pivot gears 102 in an opposite rotational direction about the "X" axis under second certain conditions. The pivot gear 102 may include one or more additional detents 301 representing intermediate orientations arising between the first orientation and the third orientation, such intermediate orientations being one or more second orientations. For at least one embodiment, a single detent may be provided. For such a configuration, rotation of the upper mast 101 will be possible between the first orientation and the third orientation.

As shown in FIG. 3, the pivot gears 102 may include respective extensions, such as right extension portion 116R, which are offset from respective illustrative center line, such as right center line "CR" extending vertically (in the "Y" direction) and through the collapsible attachment 100. As shown in FIG. 3, the illustrative right center line "CR" intersects a center 118R of the right pivot gear 102R. A corresponding left center line "CL" (not shown) intersects a center 118L of the left pivot 102L, with a corresponding left extension 116L being offset from the illustrative left center line CL. It is to be appreciated that by offsetting the respective left and right extensions 116L/116R, and by adjusting widths of the detents 301, the pivot gears 102 may be configured such that an increasing amount of force upon an antenna is needed to rotate the upper part 108 from a first orientation, thru one or more second orientations, and to a final third orientation.

The middle part 110 may include one or more shafts 103, such as a first/left shaft 103L, second/right shaft 103R, and a third/center shaft 103C. These shafts 103 may provide corresponding channels, such as right channel 120R, in which the pivot gears 102 respectively reside. Each of the left and right shafts 103L/103R may include a tab (not shown) that extends into the channel and is configured to correspond to the detents 301 of the pivot gears 102. As the upper part 108 is oriented, at least one detent 301 is aligned with the tab. The height and width of the tab relative to the height and width of the detents enables the collapsible attachment to account for different load forces exerted upon an antenna assembly by allowing rotation and change of orientation of the upper part relative to the middle and lower parts.

As further shown in FIGS. 1-2, the middle part 110 may include a connecting member 122 configured to position the center shaft 103C relative to the first/left shaft 103L and second/right shaft 103R. The third/center shaft 103C may be provided to increase the structural integrity of the middle part 110 under different load conditions. The center shaft 103C may include an opening through which an axel 124 may extend. The axel 124 may further extend through the outer surfaces of each of the left pivot gear 102L and the right pivot gear 102R. The extensions of the axel 124 beyond the outer surfaces of the pivot gears 102L/102R facilitate attachment of respective left retention element 106L and right retention element 106R to the upper part 108, as shown for example in FIG. 2. The retention elements 106 may include the use of springs, bands or other materials possessing resilient properties.

As further shown in FIGS. 1-3, the middle part 110 may include a left slot and a right slot in the left shaft 103L and right shaft 103R, respectively. Left and right tension bolts 107L/107R may be positioned to extend through the respective left slot 126L and 126R and beyond the outer surfaces of the left shaft 103L and right shaft 103R. Such extensions facilitate attachment of respective left retention element 106L and right retention element 106R to the middle part 110, as shown for example in FIG. 2. For at least one embodiment, the retention force r exerted by the respective retention elements 106L/106R on the respective upper part 108 and middle part 110 may be adjusted by changing the location (up or down) of the left and right fixture bolts 107L/107R, with change in location downward increasing the retention force r upon which the upper part 108 engages the channels of the lower part 112 and vice versa. As shown, two fixture bolts may be utilized. However, in other embodiments non-adjustable extensions instead of tension bolts may be used. Or, a single tension bolt configured for use with a single retention element may be used. Or, a single tension bolt extending through and beyond each of the left shaft and the right shaft and configured for use with two retention elements may be used.

Further, it is to be appreciated that the retention elements 106 create vertical forces (i.e., tension) between the tension bolts 107 and the axel 124, such forces are in turn imparted on the pivot gears 102 and the left and right shafts 103L/103R. In accordance with at least one embodiment of the present disclosure, this tension is minimized when the upper mast 101 is in its substantially vertical position. The upper mast 101 is able to pivot backward via the pivot gear, which rotates around the axel 124. However, such pivoting may only occur when a backward force is applied to the upper mast 101 that exceeds the tension of the retention elements 106, as propagated by the pivot gears 102 onto the tabs (not shown) provided in the respective channels 120 of the left shaft 103L and the right shaft 103R.

Likewise, it is to be appreciated that the location and/or configuration of the retention elements 106 are not limited per the present disclosure to the embodiments shown in FIGS. 1-3. Other embodiments may use other configurations for providing a tension between the upper part 108 and the lower part 112, such that a force of a certain given quantity is needed to rotate the upper mast 101 relative to the lower part 112 between a first orientation, one or more second orientations, and a third orientation. Such other configurations may include use of internal (versus as shown external) retention elements, rotational retention elements, ratchet mechanisms or otherwise.

As further shown in FIGS. 1-3, the collapsible attachment 100 may include a lower part 112 configured to attachment to a lower mast, such as a lower mast 404 shown in FIG. 4. The lower part 112 may be configured to include a mast clamp 104. One or more fasteners 128 may be utilized to secure mast clamp 104 to a lower mast 404.

In accordance with at least one embodiment of the present disclosure, the lower part 112 and middle part 110 may be formed as a single piece. The upper part 108 may be formed as a separate piece. However, as will be readily appreciated by those having ordinary skill in the art after becoming familiar with the teachings herein, these components may also be formed in multiple pieces and assembled together using existing and/or later arising fastening devices and/or techniques, such as bolts, screws, welds, adhesives, or any other joining devices and/or methods known or later arising in the art.

For at least one embodiment, rotation of the upper part may be controlled, at least in part, by the use of two retention elements 106 aligned parallel to the center shaft of the middle part 110. The retention elements may be manufactured in spring like or other known structural forms. The retention elements may exert downward retention forces r (which are shown as force "P" in FIG. 1) during normal wind load conditions, such that the engagement of the detents in the pivot gears 102 with the tab in the left shaft 103L and right shaft 103R provide sufficient interference and friction forces (collectively, "tension forces") to prevent rotation of the upper mast 101 relative to the lower mast 404. As the mast clamp 104 begins to experience an axial load caused by a wind event beyond the specified limit on the reflector, the pivot gears 102 will start to exhibit enough force on the tab to overcome the downward retention force P and any tension force t provided by a detents engagement with the tab. The pivot gears 102 will then rotate to a next detent in the pivot gears 102.

In accordance with at least one embodiment of the present disclosure, it may be desirable to have several detents in the pivot gear 102. Such detents may be configured to support retention of the upper part 108 at one or more second orientations relative to the lower part 112, such one or more second orientations may provide intermediate positions for the antenna assembly and may exist between a desired first orientation and any desired third orientation. In a normally installed operational configuration, a reflector of the antenna may be positioned at different elevations based on geographical location. Such elevations may correspond to the first orientation or one or more second orientations. It is to be appreciated that the varying elevations may result in an antenna having a profile that is greater or lesser to a wind direction. Such wind directions may change over time, such as may occur with updrafts, downdrafts and side drafts. Accordingly, for at least one embodiment, position adjustable tension bolts may be used to account for variances based upon elevation, geography, dominant wind characteristics or otherwise.

FIG. 4 provides a top front isometric view of a collapsible attachment 100 in association with an antenna assembly 400 in accordance with at least one embodiment of the present disclosure. As shown, the antenna assembly 400 may include a reflector 401, a feed arm 402, and a low-noise block downconverter (LNB) 403 mounted to the feed arm 402. A backing structure, not visible in this view, holds the antenna assembly 400 to the upper mast 101 of the collapsible attachment 100. The mast clamp 104 attaches to a lower mast 404. In a standard installation, this is simply referred to as the mast, but in the present disclosure the mast occurs in two parts, and it is necessary to distinguish between the upper mast 101 and the lower mast 404. In accordance with at least one embodiment of the present disclosure, the lower mast 404 attaches to a mast mount 405, which may take a variety of different forms depending on what surface it attaches to or rests on. In the case of a non-penetrating antenna mount installation, the mast mount may rest on ground or pavement and may be secured with weight or ballast such as cinder blocks that prevent it from tipping or sliding.

FIG. 5 is a right side view of a collapsible attachment 100 in association with an antenna assembly 400 experiencing a wind load in accordance with at least one embodiment of the present disclosure. Visible are the collapsible attachment 100, reflector 401, feed arm 402, LNB 403, lower mast 404, and mast mount 405. Also visible in this view is the backing structure 501 that connects the antenna assembly 400 to the collapsible attachment 100.

These components may be designed to withstand static and dynamic loads for a given intended use environment. Such use environments may vary by topography, location, latitude, longitude or otherwise. Non-limiting examples of use environments include, but are not limited to, wind, hurricane, tornado, snow, ice, and other environments.

Often, the reflector 401 may represent a concave surface such that winds capable of damaging the antenna assembly 400 will arise, if at all, perpendicular to the surface of the reflector 401, marked here as the −Z direction. The perpendicular wind force experienced by the reflector 401, which we will represent here as $\underline{f}$, is approximately equal to the total wind force (which we will represent here as F) times the cosine of the angle between the wind direction and the −Z axis, which we will represent here as θ. This relationship can be represented as:

$$\underline{f} \approx F * \cos\theta$$

In this exemplary view, θ is equal to zero and thus $\underline{f} \approx F$, although a reader of ordinary skill in the art will understand that wind may impinge on the reflector 401 from any direction, winds of concern for many antenna installations typically arise from a substantially horizontal direction. Because an angle of zero may be difficult to represent visually, θ is not marked in this view.

As a design choice, and in accordance with at least one embodiment of the present disclosure, there may optionally be a notch or detent 301 at this position that permits the antenna assembly to be retained at this angle with a tension force that we will refer to here as $\underline{t}$. Furthermore, the retention element 106 may be configured to hold the pivot gear 102 and upper mast 101 in a substantially vertical position with a retention force that we will refer to as $\underline{r}$. If the wind force $\underline{f}$ on the reflector exceeds the sum of the retention force $\underline{r}$ and tension force $\underline{t}$, $$\underline{f} > \underline{r} + \underline{t}$$

then the collapsible attachment 100 may be configured to rotate in one or more rotations from the first orientation, through one or more, if any second orientations, until the upper mast 101 is configured into the third orientation as described above.

FIG. 6 is a right side view of a collapsible attachment 100 in association with an antenna assembly 400 experiencing a wind load in accordance with at least one embodiment of the present disclosure. Visible are the collapsible attachment 100, reflector 401, feed arm 402, LNB 403, lower mast 404, mast mount 405, and backing structure 501.

In this exemplary view, the wind force is horizontal, and of sufficient force that it has overcome the retention force $\underline{r}$ on the retention elements 106 (not pictured) and optionally, as a design choice, the tension force $\underline{t}$ on the pivot gear (not pictured), such that the upper mast 101 (not shown) has rotated to a second orientation. It should be noted that if a detent 301 intended to retain the antenna assembly 400 in the second orientation is not provided, a tension force $\underline{t}$ that exceeds the retention force $\underline{r}$ of the retention elements 106 may be needed to prevent the antenna assembly from reverting back to its first orientation once the wind force F has abated sufficiently. Uncontrolled rotations of the upper mast 101 between a second orientation and a first orientation may be avoided by use detents or other ratcheting type mechanisms. Uncontrolled rotations may result in flutter or other undesirable movements of the antenna assembly 400.

In the configuration shown in FIG. 6, the wind force impinges on the reflector 401 at an angle θ of approximately 45 degrees. In this case, the force $\underline{f}$ on the reflector 401 is equal to the total wind force F times the cosine of approximately 45 degrees, which is approximately 0.7071. Thus, a reader of ordinary skill in the art will understand that by use of the collapsible attachment 100 and rotation of the upper mast 101 from a first orientation to a second orientation, the wind force impinging on the reflector 401 is reduced by approximately 29.29%. This may result in less stress to the antenna assembly, and less chance of a wind-related failure. Additional wind drag forces remain, including but not limited to drag on the rim of the reflector 401, drag on the lower mast 404, and drag on the feed arm 402 and LNB 403, but a reader of ordinary skill in the art will understand that these forces are negligible compared to the drag on the reflector 401.

FIG. 7 is a right side view of a collapsible attachment 100 in association with an antenna assembly 400 experiencing a wind load in accordance with at least one embodiment of the present disclosure. Visible are the collapsible attachment 100, reflector 401, feed arm 402, LNB 403, lower mast 404, mast mount 405, and backing structure 501.

In this exemplary view, the wind force is horizontal, and sufficiently large that it has overcome the retention force $\underline{r}$ on the retention elements 106 (not pictured) and optionally, as a design choice, the tension force $\underline{t}$ on the pivot gear (not pictured).

In the configuration shown in this FIG. 7, the wind force impinges on the reflector 401 at an angle θ of approximately 90 degrees. In this case, the force $\underline{f}$ on the reflector 401 is equal to the total wind force F times the cosine of approximately 90 degrees, which is approximately zero. Additional wind drag forces remain, including but not limited to drag on the rim of the reflector 401, drag on the lower mast 404, and drag on the feed arm 402 and LNB 403, but a reader of ordinary skill in the art will understand that these forces are negligible compared to the drag on the reflector 401. Thus, while the total wind force impinging on the antenna assembly 400, and its supporting structures, is not reduced to zero in this configuration, a reader of ordinary skill in the art will understand that the collapsible attachment 100 facilitates a reduction in the total wind force impinging on the antenna assembly 400, and its supporting structures. Such reductions in wind force may be sufficient to enable an antenna assembly 400 to withstand a wind load force of fifty-five miles per hour (55 m.p.h.) or greater without incurring deformation of the reflector 401 or elements of the antenna assembly 400 becoming airborne. Such wind force reductions may also result in substantially less stress to the antenna assembly, and substantially less chance of a wind-related failure.

Once the wind event has concluded, the antenna assembly 400 may be returned to its first orientation through the application of a manual force $\underline{m}$ by a technician, customer, or end user. In this case, the sum of the manual force $\underline{m}$ and the tension force $\underline{t}$ must exceed the retention force $\underline{r}$:

$$\underline{m} + \underline{t} > \underline{r}$$

It is also to be appreciated that the wind-related failures, which can be avoided by use of an embodiment of the present disclosure, may result in technical problems including loss of service, damage to equipment, and damage to property downwind of the antenna assembly, and may further result in safety risks or injuries to human beings. Therefore, a reduced chance of wind-related failure may lead naturally to a reduction in these problems and risks.

Further, it is to be appreciated from the various views that the collapsible attachment 100 does not substantially alter the mass or volume of the antenna assembly 400 and its supporting structures, or the number of steps required to install the antenna assembly and its supporting structures. Thus, the collapsible attachment 100 does not substantially increase storage, packaging, shipping, or installation costs. In fact, as will be readily appreciated by those having ordinary skill in the art after becoming familiar with the teachings herein, any slight increases in storage, packaging, shipping or installation costs may be more than offset by decreases in other costs including maintenance, repair, insurance, liability, and otherwise, as well as reductions in the cost of storage, packaging, shipping, and installation for ballast material.

In a nutshell and in accordance with at least one embodiment, a collapsible attachment 100 is configured to permit rotation of the upper mast 101 such that a reflector attached, directly or indirectly, thereto can be rotated automatically (i.e., without requiring human intervention) from a first orientation into a third orientation that is substantially parallel to a horizontal wind condition, as shown for example in FIG. 7. It is to be appreciate such a third orientation minimizes drag during a severe wind event.

As explained previously, for at least one embodiment, a collapsible attachment 100 is configured to rotate the upper mast 101 from the first orientation to the third orientation when wind incident on a reflector portion of an antenna exceeds 55 miles per hour. For at least one embodiment, reconfiguring of the antenna back into the first orientation may occur by a user, such as a repair technician or unskilled end user, applying an upward pressure on the upper mast 101 while rotating the upper mast back to the first orientation. For at least one embodiment and when the antenna assembly rotates to the third orientation under undesirable wind conditions, permanent deflection, deformation, or damage to the antenna system may be prevented. Accordingly, upon rotation of the upper mast 101 back into the first orientation, the antenna assembly will desirably remain aligned so as to receive radio frequency signals at a "peaked" elevation with respect to the satellites and/or other transmitting sources with respect to which the antenna is used to send and/or receive communications signals.

Likewise, it is to be appreciated that the various embodiments of the present disclosure facilitate changes in materials and/or techniques used for installing antenna systems. For example, technicians performing an antenna installation using a non-penetrating antenna mount (i.e., one that does not bolt to a roof or other fixed structure, or to a mast embedded securely in the ground) may use sufficient ballast to ensure the non-penetrating mount does not tip or slide during wind events of below 55 mph. In accordance with at least one embodiment of the present disclosure, this value is known to be around 6 cinder blocks or the equivalent. If this is compared to the approximately 30 cinder blocks needed for the current solution, large savings become apparent in cost, time, fuel, labor, and logistical support. It is to be appreciated, however, that one or more of these operations may occur in a different order or sequence of operations.

Further, it is to be appreciated that off-axis alignment of an antenna assembly may result in radio-frequency (RF) energy not being properly reflected towards a desired focal point, such as a low-noise block converter or other signal receiving device. As shown in FIG. 4, an LNB 403 may be attached to a distant end of a feed arm 402. The LNB 403 is positioned such that a desired quantity, if not the maximum quantity possible, of RF energy is reflected by a reflector 401 to a given focal point at which the LNB 403 is positioned. The LNB and/or one or more receiving components, may be positioned at such one or more focal points. Given these and other considerations, it is to be appreciated that one or more embodiments of the present disclosure facilitate highly-accurate positioning of LNBs and/or other RF energy receiving components at desired focal point locations, both before and after the occurrence of a major wind event. As used herein, "highly-accurate positioning" of an LNB relative to a focal point of reflected RF energy from a reflector means that the actual positioning of the LNB relative to the desired positioning of the LNB is within +/−1.6 degrees of specifications.

These descriptions are provided for exemplary purposes only, and should not be considered to limit the scope of any embodiment of the described collapsible antenna mast attachment, assembly of such collapsible antenna mast attachment, packaging or shipping or installation of an antenna system, or otherwise. Certain features may be added, removed, or modified without departing from the spirit of the claimed subject matter.

Based on design considerations, the components described above may be of substantially different shape than depicted in the Figures, while still operating in the same or an equivalent manner. For example, the collapsible attachment may be taller, shorter, wider, thinner, or of different cross-sectional shape than depicted herein. The mast clamp may be replaced with a mast attachment fixture that may take different forms, including but not limited to a weld, spring clamp, cotter pin and through hole, or other means known in the art to secure the collapsible attachment to the lower mast. Alternatively, and/or additionally, the collapsible attachment may be formed as part of either the lower mast or the backing assembly, rather than being a separately installed component. The tension bolts depicted in the Figures could be replaced with a single bolt, or with a retaining shaft or axle. The collapsible attachment may be turned upside down, such that the mast clamp occurs at the top rather than the bottom. The pivot gear may be affixed to or formed together with the mast clamp rather than the upper mast. The center shaft may be nonrotating, with the pivot gear rotating around it, or else the center shaft may be a rotating axle to which the pivot gear is affixed.

As will be readily appreciated by those having ordinary skill in the art after becoming familiar with the teachings herein, this disclosure solves a long-standing need in the satellite communications industry and other industries using directional antenna assemblies, by providing an antenna structure that is easily manufactured to consistent standards, as well as easily assembled and installed, while providing substantially improved resistance to damage from dynamic loads such as wind, as well as substantial reductions in the cost and logistical complexity of installation, maintenance, and repair.

A number of variations are possible on the examples and embodiments described above. For example, the device may function without detents in the pivot gear, and may thus bend to any angle during a wind event rather than snapping to a limited number of specific angles. In this case, the device may return automatically to its first orientation once the wind event has abated. Alternatively, the device may function without retention elements, and may instead rely exclusively on the retention force of the detents in the pivot gear. The components described herein may be manufactured by stamping, folding, forging, molding, 3D printing, or other standard manufacturing techniques that are known in the art. The logical operations making up the embodiments of the technology described herein are referred to variously as operations, steps, objects, elements, components, or modules. It should be understood that the manufacturing, assembly, and installation steps described above may be performed in any order, unless explicitly claimed otherwise or a specific order is inherently necessitated by the claim language.

In some implementations, some or all fasteners may be eliminated by combining certain components as single units. It should further be understood that the described technology may be employed in other industries than satellite communications, and may be applied to non-satellite antennas including TV antennas, microwave and RF communication antennas, acoustic listening devices, and other devices, such as backboards for basketball goals, and otherwise.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the collapsible antenna mast attachment. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the collapsible antenna mast attachment as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. For example, components may be made of many varied materials, and may be colored or patterned for aesthetic purposes or for ease of assembly. Additionally, instructions or indicators may be provided on the collapsible attachment itself, in the form of permanent or removable stickers or other markings, that teach or demonstrate the proper configuration of the collapsible attachment before and after a wind event. Alternatively, instructions may be provided separately, or even left out entirely, given the simplicity of operation. The mechanism may even be designed to move to a wind-parallel position automatically and/or return to its substantially vertical orientation automatically, for example, by means of a remotely controlled catch, motor, winch, tensioner, ratchet, or other equivalent mechanism.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

The invention claimed is:

1. A system comprising:

a device exposed to a first force "F";

a mast mount coupled to the device and configured for resting on a surface;

a first quantity of ballast;

wherein the first quantity of ballast is proportional to the first force F;

wherein the first quantity of ballast secures the mast mount to the surface;

a collapsible attachment, coupling the device with the mast mount and extending above the mast mount, comprising:

an axle facilitating rotation of the device relative to the mast mount;

a pivot gear configured to rotate about the axle; and wherein the pivot gear is a mutilated gear that includes a first detent;

a retention element;

wherein the retention element exerts a first retention force "r1" on the pivot gear; and wherein the first retention force r1 inhibits rotation of the device towards the surface, about the axle, and from a first orientation when the first force F is less than the first retention force r1.

2. The system of claim 1, wherein a plane formed by the mast mount is substantially horizontal; and wherein the first retention force r1 is a downward vertical force.

3. A system comprising:

a device exposed to a first force "F";

a mast mount coupled to the device and configured for resting on a surface;

a first quantity of ballast;

wherein the first quantity of ballast is proportional to the first force F;

wherein the first quantity of ballast secures the mast mount to the surface;

a collapsible attachment, coupling the device with the mast mount and extending above the mast mount, comprising:

an axle facilitating rotation of the device relative to the mast mount;

a pivot gear configured to rotate about the axle; and a retention element;

wherein the retention element exerts a first retention force "r1" on the pivot gear; and wherein the first retention force r1 inhibits rotation of the device towards the surface, about the axle, and from a first orientation when the first force F is less than the first retention force r1;

wherein the pivot gear further comprises:

a first detent;

wherein the collapsible attachment further comprises:

a middle part, coupled to the pivot gear by an axle and the retention element, further comprising:

a tab;

wherein, when the device is in the first orientation, the tab engages with the first detent and provides a first tension force "t1"; and wherein the first tension force t1 inhibits rotation of the device about the axle when the first force F is less than the first retention force r1 plus the first tension force t1.

4. The system of claim 3, wherein the pivot gear further comprises:

a curved portion;

wherein the first detent is provided in the curved portion of the pivot gear; and wherein the first tension force t1 is a rotational tension force.

5. The system of claim 3, wherein, the device rotates from the first orientation to at least one of a second orientation and a third orientation when the first force is greater than the first retention force r1 plus the first tension force t1.

6. The system of claim 5, wherein, when configured in the third orientation, a second quantity of ballast secures the device; and wherein the second quantity of ballast is less than the first quantity of ballast.

7. The system of claim 5, wherein the pivot gear further comprises:

a second detent; and wherein, when the device is in the second orientation, the tab engages with the second detent and provides a second tension force t2;

the retention element exerts a second retention force r2 on the pivot gear; and the second tension force t2 and the second retention force r2 inhibit rotation of the device towards the surface when the first force F is less than the second tension force t2 plus the second retention force r2.

8. The system of claim 7,
wherein the pivot gear further comprises:
an extension, offset from a center line of the axle, coupling the device to the pivot gear; and
wherein, due to the extension, the second retention force r2 is less than the first retention force r1.

9. The system of claim 7,
wherein, when the device is in the second orientation, the second retention force r2 inhibits uncontrolled rotations of the device from the second orientation to the first orientation.

10. The system of claim 9,
wherein the first force F is a wind force.

11. The system of claim 9,
wherein the retention element facilitates automatic return of the device from the second orientation to the first orientation.

12. The system of claim 11,
wherein the second retention force does not inhibit return of the device from the second orientation to the first orientation when the first force F is less than the second tension force t2.

13. The system of claim 5,
wherein the first force F is a wind load of 55 miles per hour or greater.

14. The system of claim 5,
wherein, when the device is in the second orientation, the device is offset relative to a force direction vector "V" for the first force F at a first angle "8"; and
wherein a second force "f" imparted on the device is:

$$f \approx F^* \cos \theta.$$

15. The system of claim 5,
wherein, when the device is in the third orientation, the device is substantially parallel to the force direction vector V.

16. A system comprising:
a device exposed to a first force "F";
a mast mount coupled to the device and configured for resting on a surface;
a first quantity of ballast;
wherein the first quantity of ballast is proportional to the first force F;
wherein the first quantity of ballast secures the mast mount to the surface;
a collapsible attachment, coupling the device with the mast mount and extending above the mast mount, comprising:
an axle facilitating rotation of the device relative to the mast mount;
a pivot gear configured to rotate about the axle; and
wherein the pivot gear is a mutilated gear that includes a first detent;
a retention element;
wherein the retention element exerts a first retention force "r1" on the pivot gear; and
wherein the first retention force r1 inhibits rotation of the device towards the surface, about the axle, and from a first orientation when the first force F is less than the first retention force r1;
wherein the device is rotatable about the axis into at least one of a second orientation and a third orientation;
wherein, when the device is in the third orientation, the device is substantially parallel to a force direction vector V for the first force F; and
wherein a risk of damage to the device is less in the third orientation than in the first orientation.

17. They system of claim 16,
wherein, when the device is in the second orientation, the retention element facilitates return of the device to the first orientation when the first force F is less than the first retention force r1.

18. The system of claim 17,
wherein the first force F fluctuates over time; and
wherein the collapsible attachment includes an element providing a tension force that reduces uncontrolled rotations of the device between the second orientation and the first orientation.

19. The system of claim 18,
wherein the collapsible attachment facilitates return of the device from the third orientation to the first orientation upon application of a manually applied force.

20. The system of claim 19, comprising:
printed instructions for returning the device from a third orientation to the first orientation.

* * * * *